United States Patent Office 3,513,631
Patented May 26, 1970

3,513,631
HEAT-REACTIVATABLE ADSORBENT GAS
FRACTIONATOR AND PROCESS
Chesterfield F. Seibert and Marcel G. Verrando, Jr., Cortland, N.Y., assignors to Pall Corporation, Glen Cove, N.Y., a corporation
Continuation-in-part of application Ser. No. 439,294, Mar. 12, 1965. This application Sept. 14, 1966, Ser. No. 579,374
Int. Cl. B01d 53/04
U.S. Cl. 55—33    16 Claims

ABSTRACT OF THE DISCLOSURE

A process and apparatus for continuously removing a first gas from a mixture thereof with a second gas is provided. The gas mixture is passed through one of two sorbent beds having a preferential affinity for the first gas and the first gas is sorbed thereon forming a concentration of first gas in the first bed which ranges from a substantial proportion of its capacity at one end to less than 20% of its capacity at the other so as to produce a gaseous effluent which has a concentration of first gas therein below a predetermined maximum. At the same time, first gas sorbed on the other sorbent bed is removed therefrom by passing a purge flow of gas in contact with the second bed and heating that portion of the second bed sorbed to at least 20% of its capacity with the first gas to an elevated temperature of at least 100° C. The heating is then discontinued and the second bed is allowed to cool to a relatively efficient temperature for adsorption. The gas mixture is then passed in contact with the second bed while the first bed is desorbed in a like manner thereby maintaining a substantially continuous flow of effluent gas.

The apparatus of the invention provides a two-sorbent bed assembly having heaters positioned within the sorbent beds. The heaters extend from adjacent the inlet end of the bed through at most three-fourths of the length of the bed, and are capable of heating that portion of the bed to a temperature of at least 100° C.

---

This application is a continuation-in-part of application Ser. No. 439,294 filed Mar. 12, 1965 which was abandoned in favor of a continuation application Ser. No. 665,645 filed Sept. 5, 1967, now U.S. Pat. No 3,448,561 dated June 10, 1969.

This invention relates to a process and to a dryer for fractionating gases using a sorbent which is heated in the desorption cycle, and more particularly to a process and to a gas dryer in which a desiccant is employed to adsorb moisture from air, and in which heat is applied to regenerate the spent desiccant at the conclusion of the drying cycle.

Desiccant dryers have been marketed for many years, and are in wide use throughout the world. The usual type is made up of two desiccant beds, one of which is on the drying cycle while the other is being regenerated. The gas to be dried is passed through the desiccant bed in one direction during the drying cycle, and then, when the desiccant has adsorbed moisture to the point that there is no assurance that the moisture level of the effluent gas will meet the requirements for the system, the influent gas is switched to the other bed, and the spent bed is regenerated by passing purge effluent gas in counterflow therethrough.

The purge gas may be heated before entering the bed, but in the usual system, the bed itself is provided with heaters, and the desiccant in effect baked out to remove the adsorbed moisture. The drying and regenerating cycles are usually equal in duration, and the drying cycle may be and usually is carried out at a higher gas pressure than the regenerating cycle. Counterflow of the gas purge is used to obtain rapid removal of the adsorbed moisture with a minimum volume of purge gas.

Such dryers are nearly always inefficient in the use of heat to regenerate the bed, because heat is applied throughout the entire desiccant bed, all of which is accordingly heated to the same temperature and for the same length of time, even though the adsorbed moisture content usually decreases significantly from the point of entry of the inffluent gas to the point of exit of the dried effluent. Furthermore, because of the high temperature required to regenerate the spent desiccant, the bed acquires a considerable amount of heat during the regeneration cycle, and this is necessarily wasted when the bed is perforce cooled down at the start of the drying cycle to a temperature at which adsorption can proceed efficiently. As is well known, the process of adsorption of moisture by a desiccant is accompanied by liberation of heat, and accordingly, the efficiency of adsorption is an inverse function of the temperature.

In accordance with the invention, a process for removing moisture from gas is provided, employing a desiccant bed which on the regeneration cycle is heated to remove adsorbed moisture, but the application of heat for this purpose is restricted to those portions of the bed having a high moisture content, thereby saving time during the regeneration, and also avoiding the waste in application of heat where it is not required.

In the process of the invention, the concentration of a first gas in a mixture thereof with a second gas is reduced to below a limiting maximum concentration thereof in the second gas, by passing the mixture in contact with and from one end to another of a bed of a sorbent having a preferential affinity for the first gas, adsorbing first gas thereon to form a gaseous effluent having a concentration thereof below the maximum, and as the adsorption continues, forming a concentration gradient of first gas on the bed progressively decreasing from the one end to the other end, and an increasing concentration of first gas in the second gas defining a concentration front progressively advancing in the bed from the one end to the other end as sorbent capacity therefor decreases; discontinuing passing the gaseous mixture in contact with the bed before the front can leave the bed, and the limiting maximum concentration of first gas in the second gas can be exceeded; and then desorbing the first gas adsorbed on the sorbent bed by passing therethrough a purge gas flow while applying heat but only to that portion of the sorbent bed through which the concentration front has passed during adsorption, and preferably only to that portion of the bed reached by the concentration front during adsorption, the remainder of the bed being desorbed of first gas by the purge gas flow.

The process contemplates, as the preferred purge gas, gaseous effluent from the adsorption cycle, and a desorption at a gas pressure lower than that during adsorption, usually from 15 to 350 p.s.i. lower, and preferably at least 50 p.s.i. lower.

The advance of the moisture front in a bed of desiccant as it gradually adsorbs moisture is a well known phenomenon in the desiccant drying art, and is discussed in numerous patents, for example, Skarstrom Pat. No. 2,944,627. During the greater part of the drying cycle, the sorbent efficiently sorbs moisture from gas passing over it. When the sorbent capacity of the desiccant approaches zero, however, the moisture content of gas passed over it rises sharply. If moisture content, dewpoint or relative humidity of the gas be measured, and plotted against time, this usually sudden rise in moisture content is noted as a change in slope, and the increasing moisture content then rapidly approaches the moisture content of the influent gas. The resulting S-shaped portion of this curve in effect represents the moisture front, and if this be observed in terms of the length of the bed, it will be found to progress from the influent end to the effluent end of the bed as the adsorption cycle proceeds. The objective is to conclude the cycle before the front or change in slope of the curve reaches the end of the bed, since thereafter the rise is so rapid that delivery of undesirably moist effluent can hardly be prevented.

In the process of the invention, the moisture front normally is halted in the portion of the bed to which heat is not applied during desorption or regeneration. Preferably, it is halted at the boundary between the heated and unheated bed zones. For optimum safe bed utilization, it should be halted just short of the boundary, so that heat is applied only to the bed portions reached by the front, but it can travel beyond the boundary without creating a danger of breakthrough provided there is a sufficient capacity of desiccant in the unheated portion and a sufficient purge flow to ensure desorption or regeneration in the absence of heat.

In the preferred embodiment, heat is applied only in that portion of the bed in which the sorbent has adsorbed moisture to 20% or more of its moisture capacity, and preferably 50% or more of such capacity. In the unheated portion of the bed, the sorbent may have adsorbed moisture only to a negligible extent, particularly where the front has not reached the boundary of the heated and unheated zones, but when the front has passed the boundary, the moisture adsorption may reach as much as from 5 to 50% of its capacity. It should not exceed 50%, however, for optimum bed utilization, and normally does not exceed 20%.

As a further feature in accordance with the invention, the regeneration cycle need not be and in most cases is not of a duration equal to the drying cycle, so that the heating can be discontinued when regeneration is complete, and the remainder of the time can be used for cooling down of the regenerated bed, so that it is at a convenient and efficient temperature for adsorption when the flow of influent gas to that bed is resumed.

The drying system in accordance with the invention comprises a sorbent bed adapted for periodic and preferably counterflow regeneration, and means for applying heat during such regeneration to only that portion of the sorbent bed having a high moisture content, of the order of 20% of its moisture capacity or higher, at the conclusion of an adsorption cycle, i.e., to only that portion reached or passed by the concentration front during adsorption. The remainder of the sorbent bed is not heated during regeneration, and consequently no heating means are provided therein. The unheated portion of the bed volume can accordingly be as large as desired. Usually, from one-fourth to three fourths of the bed volume, preferably from one-third to two-thirds of the volume, will be heated.

In effect, the unheated portion of the bed constitutes a reserve bed, which in the normal drying cycle may not be required at all, and in which in any case the sorbent is apt to absorb only a relatively small proportion, possibly as much as 50% but usually less than 20%, of its capacity of moisture, but which is present in order to prevent the delivery of effluent gas of undesirably high moisture content in the unlikely event that moisture is not sufficiently adsorbed in the portion of the bed provided with heating means. The moisture-adsorbing capacity of the reserve portion of the bed is so little used that the reserve sorbent is regenerated by the purge flow, whether or not the purge flow is heated, and any moisture carried forward from this portion by purge flow therethrough is of course effectively removed from the bed after passage through the heated portion therof.

The unheated portion of the bed thus serves two principal functions. It makes it possible to remove very small amounts of moisture remaining in the gas from the heated portion of the bed. It also provides reserve capacity in case the gaseous influent exceeds in temperature or moisture content or flow rate the rated influent normally supplied to the dryer, preventing breakthrough of the front from the bed.

Since the reserve portion is unheated, the principles of operation of a heatless dryer are applicable thereto, to ensure that regeneration can be complete during the drying cycle time. Heatless dryers operate under equilibrium conditions, and the equilibrium conditions must be maintained under all of the conditions to which the dryer may be subjected in use. Hence, the volume of desiccant, purge flow, regeneration pressure and cycle time are adjusted to ensure that equilibrium is maintained.

While the system of the invention can be composed of one desiccant bed, the preferred system employs a pair of desiccant beds, disposed in appropriate vessels, which are connected to the lines for reception of influent gas to be dried, and delivery of effluent dried gas.

The drying system can also include a check valve or throttling valve for the purpose of reducing pressure during regeneration, and multiple channel valve for cycling the flow of influent gas between the beds and for receiving the flow of effluent gas therefrom. In addition, a metering or throttling valve can be included to divert a portion of the dried effluent gas as purge in counterflow through the bed being regenerated.

It is preferred, in accordance with the invention, to regenerate a spent bed by purge gas in counterflow to influent gas being dried, in accordance with the normal practice of the art, to provide efficient removal of adsorbed moisture with minimum gas loss. It will, however, be understood that if desired the purge flow can be passed through the bed in the same direction as the influent flow, with a corresponding loss in efficiency. In such a system, the reserve portion of the bed may become progressively saturated with moisture, depending upon the moisture content of the influent gas and the degree of saturation of the desiccant bed during the drying cycle, and if this occurs, the use of counterflow will of course be essential, at least from time to time, to strip the reserve bed of excessive adsorbed moisture during regeneration.

The drying system in accordance with the invention is illustrated in the drawings, in which.

Figure 1:
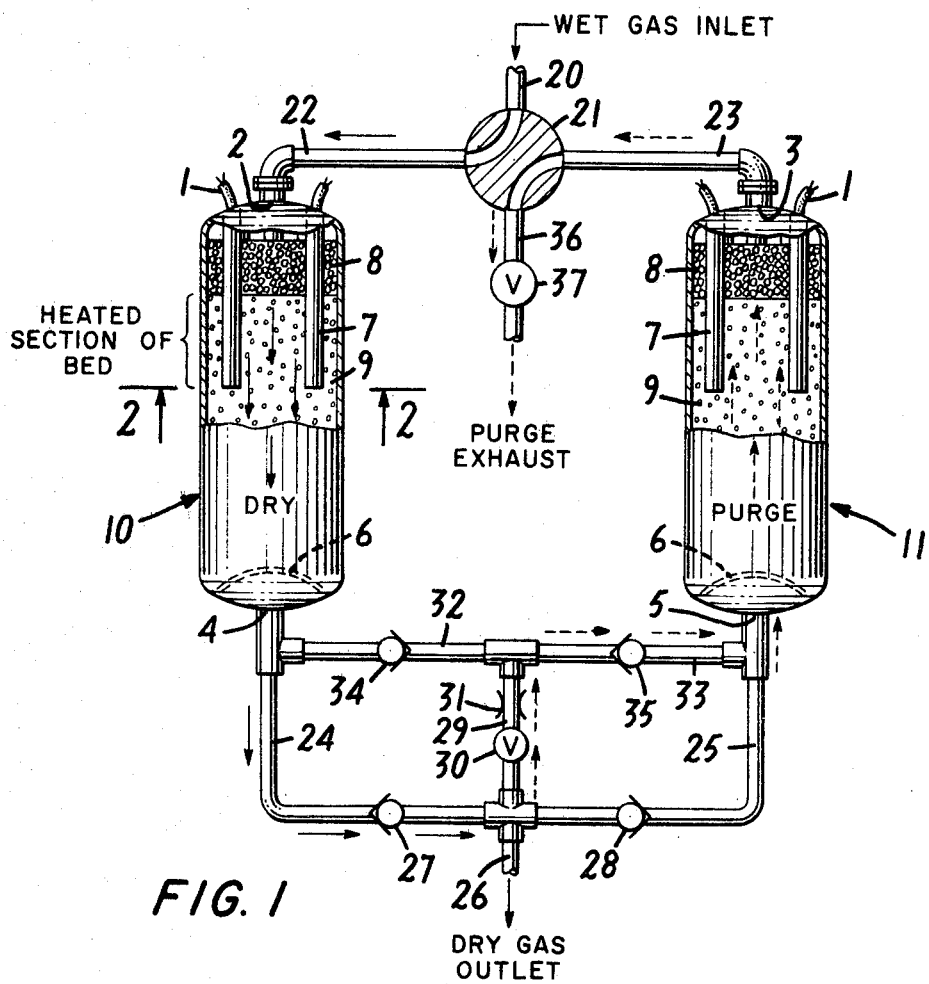
FIG. 1 is a schematic view of a two-bed two-tank dryer in accordance with the invention.
Figure 2:
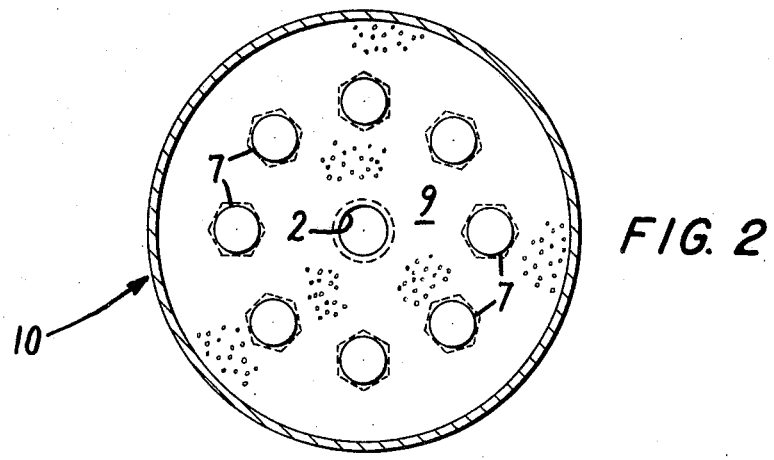
FIG. 2 is a cross-sectional view taken along the lines 2—2 of FIG. 1, through the heated portion of the tank.

The dryer shown in FIGS. 1 and 2 is composed of a pair of tanks 10 and 11, each having at one end an inlet 2 and 3, and at the other end an outlet 4 and 5. Disposed across the outlets of each are stainless steel support screens 6, made of wire mesh or perforated steel plate, the purpose of which is to retain the desiccant particles within the tanks.

The tanks are filled with desiccant in two layers 8 and 9, the first layer 8 extending approximately one-sixth the length of the bed, made up of activated alumina, and the second layer 9 composed of the remainder of the bed, made up of silica gel. The activated alumina has a higher resistance to pressure changes, and changes in moisture content, than the silica gel, so it withstands use better than silica gel at the inlet ends of the beds.

Disposed at the inlet end of each bed and extending approximately two-fifths of the length of the bed is an array of elongated heater elements 7, in this case eight in number (as seen in FIG. 2). These are arranged concentrically, and evenly spaced through the bed. However, it will be appreciated that a lesser or greater number of elements can be used, according to their heat capacity. The inlet ends of the heaters are provided with electrical connections 1, which extend through the walls of the tanks 10 and 11, and are connected to the electrical system in a manner such that the heaters are turned on when the bed is put on the regenerating cycle, and turned off at the end of a predetermined time, sufficient to effect regeneration of the desiccant, which may be less than the duration of the drying cycle, or which may be equal to the length of the drying cycle.

The tanks 10 and 11 are interconnected by a system of lines, to ensure delivery of influent gas to be dried to the inlet of either bed, and the withdrawal of dried gas from the outlet of either bed, with lines for directing purge flow bled off from the effluent to the top of either bed for regeneration, and to vent it to atmosphere after leaving the bottom of each bed. This system is composed of a wet gas delivery line 20, which conducts wet gas to the four-way switching valve 21, and then through either line 22 or 23 to the top of tanks 10 and 11, respectively. Similar line connections 24 and 25 extend between the outlets of the two tanks. Flow along these lines to outlet line 26 is controlled by the switching valves 27 and 28. Another line 29 leads from the junction of lines 24 and 25 to a purge-metering valve 30, which controls the volume of purge flow bled from the dry gas effluent for regeneration of the dryer bed on the regeneration cycle. The line 29 leads the purge flow through pressure-reducing orifice 31 to one of lines 32, 33 and check valves 34 and 35, to the outlets 4 and 5 of tanks 10 and 11. A purge exhaust line 36 leads from the four-way valve 21 past exhaust valve 37, to vent purge to atmosphere.

If tank 10 is on the drying cycle, and tank 11 on the regenerating cycle, then operation of the dryer is as follows: Wet gas at line pressure 25 to 350 p.s.i.g., entering through line 20, is diverted by valve 21 into line 22 to tank 10, and passes thence downwardly through the layers 8 and 9 to the outlet, whence it is conducted via line 24 past the open valve 27 to the exhaust line 26. Valves 28 and 34 are closed, preventing flow in lines 25 and 32, respectively. A portion of the effluent, as controlled by the purge valve 30, is then passed through line 29, through orifice 31, where its pressure is reduced to atmospheric, due to open vent valve 37, into line 33, past open valve 35 (valve 34 is closed, preventing flow in line 32) to the bottom of the second tank 11, which is on the regeneration cycle, and it passes thence upwardly through the bed to the inlet 3 and thence through the line 23 to the four-way switching valve 21, and is vented to the atmosphere through the purge exhaust line 36 and valve 37.

When the predetermined cycle time has elapsed, an electric switch is activated, which first closes valve 37 to permit repressurization of the tank 11. At the end of a predetermined time period, allowing sufficient time for repressurization of tank 11, a motor is actuated to rotate the four-way switching valve 21 through 180°, so as to divert influent gas to line 23 to the top of the second tank 11 on the drying cycle, while at the same time the valves 27 and 35 are closed, and the valve 28 is opened. Valve 37 is now opened to depressurize tank 10 and open the purge system to atmosphere. Purge flow now passes through line 29, orifice 31 and line 32 past valve 34 to the bottom 4 of the tank 10, which is now on the regeneration cycle. At the time valve 21 is switched, the heaters 7 in bed 10 are turned on, heating the bed to reactivate the desiccant. This cycle continues until the predetermined cycle time has elapsed, whereupon the valves 21, 27, 28, 34 and 35 are again switched, and the cycle is repeated.

Whenever the tank 10 or 11 is on the regeneration cycle, the array of heaters 7 therein is activated, and the desiccant bed is baked out while being subjected to the purge flow for the time required to fully regenerate the desiccant. This time may be considerably less than the drying cycle time, which of course is determined not by a fixed time cycle, but by the moisture level in the gas in the bed. Consequently, the heaters 7 are timed so as to be activated only for the time necessary to complete regeneration of the desiccant, and when this time has elapsed, they are automatically shut off. Purge flow of gas is continued only for a time sufficient to cool the desiccant bed to room temperature, at which temperature the adsorption is more efficient, and then it too is automatically shut off by closing purge exhaust valve 37, repressurizing the spent bed, and readying it for the next cycle. Normally, from a half-hour to two hours is adequate to effect complete regneration of a spent bed, if the bed is heated by the heating elements to a temperature within the range from 100 to 250° C., and from ½ to 1 hour is enough to cool it. However, other temperatures and times can of course be used, depending upon the desiccant that is employed.

Figure 3:
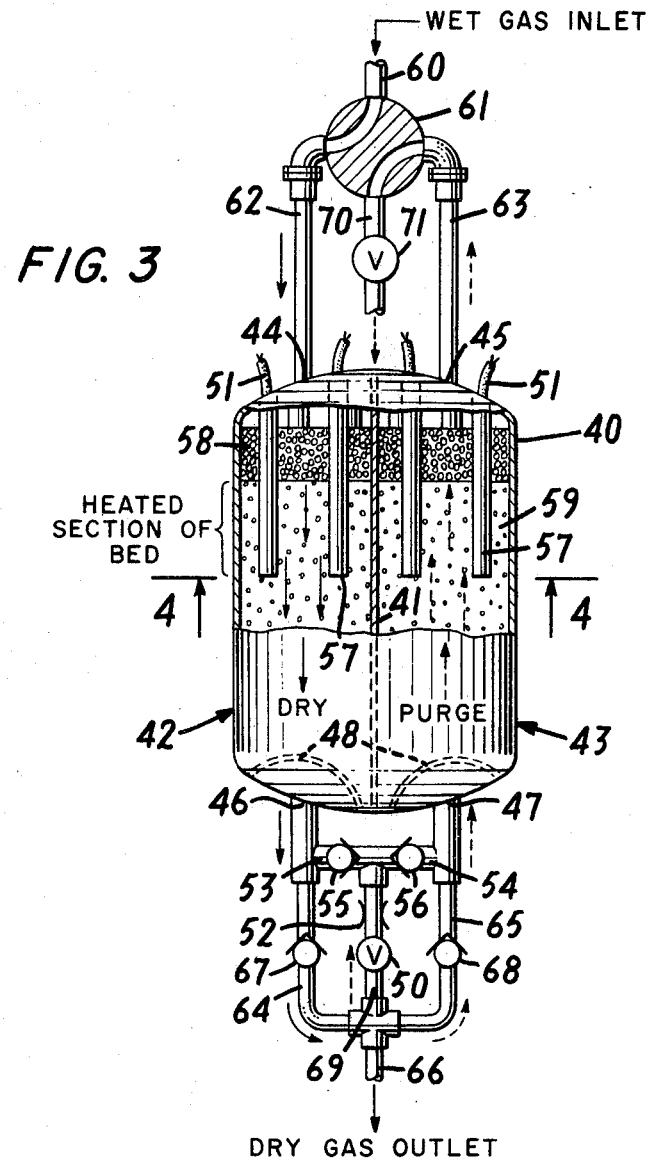
FIG. 3 is a schematic view of a two-bed dryer in accordance with the invention, held within a single tank.
Figure 4:
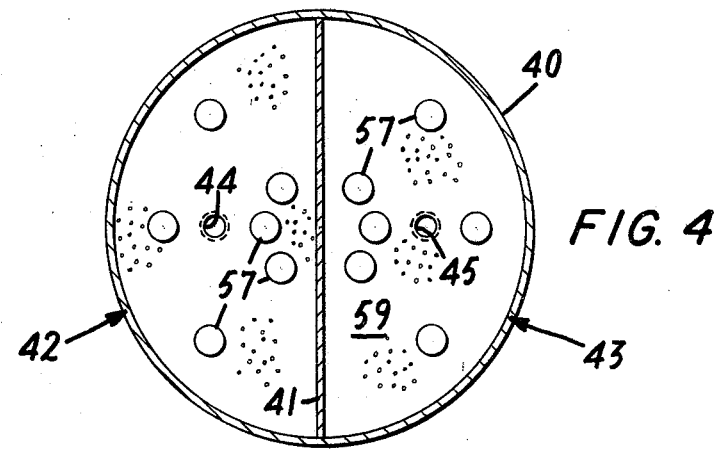
FIG. 4 is a cross-sectional view taken along the lines 4—4 of the dryer of FIG. 3, through the heated portion of the tank.

The single tank dryer shown in FIGS. 3 and 4 is composed of a single tank shell 40 within which is disposed a central barrier 41 separating the tank into two chambers 42 and 43, each having at one end an inlet 44 and 45, and at the other end an outlet 46 and 47. Disposed across the outlets of each are stainless steel support screens 48, made of wire mesh or perforated steel plate, the purpose of which is to retain the desiccant particles within the tanks.

The tanks are filled with desiccant in two layers 58 and 59, the first layer 58 extending approximately one-sixth the length of the bed, made up of activated alumina, and the second layer 59 composed of the remainder of the bed, made up of silica gel. The activated alumina has a higher resistance to pressure changes, and changes in moisture content, than the silica gel, so it withstands use better than silica gel at the inlet ends of the beds.

Disposed at the inlet end of each bed is an array of elongated heater elements 57, in this case four in number (as seen in FIG. 4). These are arranged concentrically, and evenly spaced through the bed. However, it will be appreciated that a lesser or greater number of elements can be used, according to their heat capacity. The inlet ends of the heaters are provided with electrical connections 51, which extend through the walls of the tank 40 and are connected to the electrical system in a manner such that the heaters are turned on when the bed is put on the regenerating cycle, and turned off at the end of a predetermined time, sufficient to effect regeneration of the desiccant, which may be less than the duration of the drying cycle, or which may be equal to the length of the drying cycle.

The chambers 42, 43 are interconnected by a system of lines, to ensure delivery of influent gas to be dried to the inlet of either bed, and the withdrawal of dried gas from the outlet of either bed, with lines for directing purge flow bled off from the effluent to the top of either bed for regeneration, and to vent it to atmosphere after leaving the bottom of each bed. This system is composed of a wet gas delivery line 60, which conducts wet gas to the four-way switching valve 61, and then through either line 62 or 63 to the top of chambers 42 and 43, respectively. Similar line connections 64 and 65 extend between the outlets of the two chambers. Flow along these lines to outlet line 66 is controlled by the switching valves 67 and 68. Another line 69 leads from the junction of lines 64 and 65 to a purge-metering valve 50, which controls the volume of purge flow bled from the dry gas effluent for regeneration of the dryer bed of the regeneration cycle. The line 69 leads the purge flow through pressure-reducing orifice 52 to one of lines 53, 54 and check valves 55 and 56, and to the outlets 46 and 47 of chambers 42 and 43. A purge exhaust line 70 leads from the four-way valve 61 past purge exhaust valve 71, to vent purge to atmosphere.

If chamber 42 is on the drying cycle, and tank 43 on the regenerating cycle, then operation of the dryer is as follows: Wet gas at line pressure, 25 to 350 p.s.i.g., entering through line 60, is diverted by valve 61 into line 62 to chamber 42, and passes thence downwardly through the layers 58 and 59 to the outlet, whence it is conducted via line 64 past the open valve 67 to the exhaust line 66. Valves 68 and 55 are closed, preventing flow in lines 65 and 53, respectively. A portion of the effluent, as controlled by the purge valve 50, is then passed through line 69, through orifice 52, where its pressure is reduced to atmospheric, due to open purge valve 71, into line 54, past open valve 56 (valve 55 is closed, preventing flow in line 53) to the bottom of the second chamber 43, which is on the regeneration cycle, and it passes thence upwardly through the bed to the inlet 45 and thence through the line 63 to the four-way switching valve 61, and is vented to the amosphere through the purge exhaust line 70 and valve 71.

When the predetermined cycle time has elapsed, an electric switch is activated, which first closes purge exhaust valve 71, to repressurize the chamber 43, and then about 30 seconds later switches the four-way switching valve 61 through 180°, so as to divert influent gas to line 63 to the top of the second chamber 43 on the drying cycle, while at the same time the valves 67 and 56 are closed, and the valves 55, 68 and 71 opened. Purge flow now passes through line 69, orifice 52 and line 53 past valve 55 to the bottom 46 of the chamber 42, which is now on the regeneration cycle. At the time valve 61 is switched, the heaters 57 in chamber 42 are turned on, heating the bed to reactivate the desiccant. This cycle continues until the predetermined cycle time has elapsed, whereupon the valves 61, 67, 68, 55 and 56 are again switched, and the cycle is repeated.

Whenever the chamber 42 or 43 is on the regeneration cycle, the array of heaters 57 is activated, and the desiccant bed is baked out, while being subjected to the purge flow for the time required to fully regenerate the desiccant. This time may be considerably less than the drying cycle time, which of course is determined not by a fixed time cycle but by the moisture level in the gas in the bed. Consequently, the heaters 57 are timed so as to be activated only for the time necessary to complete regeneration of the desiccant, and when this time has elapsed, they are automatically shut off.

Purge flow of gas is continued only for a time sufficient to cool the desiccant bed to room temperature, at which temperature the adsorption is more efficient, and then it too is automatically shut off by closing purge exhaust valve 71, repressurizing the spent bed, and readying it for the next cycle. Normally, from a half-hour to two hours is adequate to effect complete regeneration of a spent bed, if the bed is heated by the heating elements to a temperature within the range from 100 to 250° C., and from ½ to 1 hour is enough to cool it. However, other temperatures and times can of course be used, depending upon the desiccant that is employed.

The process of the invention can be carried out utilizing any type of desiccant, including, for example, silica gel, activated alumina, Mobilbeads, magnesium sulfate, calcium sulfate, zeolites, both natural and synthetic such as chabasites, analcite, and the synthetic zeolites described in U.S. Pat. Nos. 2,306,610, 2,442,191 and 2,522,426.

The adsorption can be carried out at atmospheric pressure. However, since the rate and extent of adsorption increases with pressure, it is usually preferred that it be carried out at a superatmospheric pressure, generally from about 30 to about 10,000 p.s.i.g. On the other hand, regeneration proceeds more efficiently and effectively at a reduced pressure, and thus it would be preferable in most instances to use a reduced pressure during this portion of the cycle. If the adsorption is carried out at a superatmospheric pressure, then regeneration is conveniently carried out at reduced pressure, say, at 0.1 to 10 p.s.i., such as by application of a vacuum pump, water pump, or steam ejector.

The flow rate will be determined according to system requirements. The faster the flow, the more frequent the cycling and/or the larger the volume of desiccant required. Flow rates up to 8000 s.c.f.m. are readily accommodated without loss of effectiveness, with most desiccants.

The regeneration of the spent desiccant in accordance with the invention is effectively brought to completion by the use of heat. Temperatures of from 100 to 350° C. can be used. The heat applied is sufficient to remove substantially all of the adsorbed moisture, for maximum efficiency of operation. Of course, if maximum efficiency is unnecessary, then the regeneration need not be carried as far as substantially complete regeneration. However, inasmuch as the efficiency of adsorption decreases as the adsorbent takes up moisture, it is obviously more desirable in nearly every instance to completely regenerate, if possible.

It will of course be understood that the term "complete regeneration" is used in its normal sense. It is, of course, impossible to ever remove all of the moisture content of an adsorbent, even by long continued heating, with application of vacuum. However, by the use of heaters in the parts of the bed having the greatest moisture content, it is possible to carry the regeneration to a state at which moisture cannot be detected in the effluent purge, and that is the art-accepted meaning of the term.

The dryer size and operating conditions required for a given wet gas are, of course, readily determined by those skilled in the art. The variables to be controlled include the temperature of regeneration, the volume of desiccant, the time for the regenerating cycle, and the moisture content of the desiccant reached during the drying cycle. The following computation will be exemplary.

Let it be assumed that the system provides two tank chambers having an internal diameter of 12 inches and a total length of 51 inches effective bed length, giving a volume of 3.34 cubic feet for a desiccant bed in each tank. Let it be further assumed that a bed of activated alumina be provided 3 inches long at the influent end, and a bed of silica gel 48 inches long in the remainder. Further, the length of the heaters within the heated portion of the bed, including the 3 inch alumina bed and 17 inches of the silica bed, is 20 inches.

The influent flow proceeds past the heaters towards the bottom of the bed through the alumina portion first and the silica gel second, and the purge counterflow proceeds from the effluent end, passing first through the silica gel portion which has no heaters and then past the silica gel portion in which the heaters are located, and through the alumina portion.

It is customary to design a heat regenerated dryer on the basis that the total moisture content of the influent air during the drying period, assuming rated flow of saturated air, is less than 5% of the weight of the desiccant in the bed. To rephrase this criterion, it is assumed that virtually all the water is adsorbed by the influent one-third of the bed and the average water content of this part of the bed is 15% by weight.

In this case, one-third of the bed is one-third of 3.34 or 1.11 cubic feet. The desiccant weight in this portion of the bed is 54.5 lbs. and the weight of water to be collected is 15% of 54.5 lbs. or 8.2 lbs.

It is further customarily assumed in calculations that the maximum air inlet temperature is 100° F. unless more accurate data is available for a given application. In this case, saturated air at 100° F. will contain 0.00279 lb. of moisture per cubic foot. Thus, for a one hour drying cycle, this bed can handle a flow rate of $$\frac{8.2}{60 \times 0.00279} = 49 \text{ c.f.m.}$$

If the inlet pressure is 100 p.s.i.g., the inlet flow rate can be $$49 \times \frac{114.7}{14.7} = 382 \text{ s.c.f.m.}$$

It is thus evident from this computation that such a bed has a very high moisture capacity.

The computation of the purge flow for such a bed would be as follows: For a one hour regeneration cycle, allowing two minutes for depressurization, two minutes for repressurization, and two minutes' delay before switching the beds, there would be a lost regeneration time of six minutes, of a total cycle time of sixty minutes. The heaters can be operated during depressurization so that time period is not lost, and the actual time lost is only four minutes.

During the remaining 56 minutes of the cycle, the bed must be heated up to regeneration temperature and then cooled off. Only about half of this time period will be effective for regeneration so the purge flow must be capable of carrying off 8.2 lbs. of moisture in 26 minutes with an outlet gas temperature of 160° F., assuming the gas is only 80% efficient in taking moisture from the desiccant and therefore has a relative humidity of 80%. Under these conditions, each cubic foot of purge gas will hold $$.80 \times .0143 = .01145 \text{ lbs. of moisture}$$

The purge flow must then be $$\frac{8.2}{.01145 \times 26} = 28 \text{ s.c.f.m.}$$

Based on 380 s.c.f.m. inlet flow, a 28 s.c.f.m. purge is about 7½% of the inlet flow.

The heat requirements are computed as follows:
The weight of desiccant in the heated portion of the bed is 64 lbs. The heat needed to heat this weight of desiccant to 300° F. from 100° F. is $$64 \times 200 \times .25 = 3200 \text{ B.t.u.}$$

The heat required to desorb 8.2 lbs. of water is $$8.2 \times 1450 = 11,900 \text{ B.t.u.}$$

Tests show that the bed can be adequately cooled in 21 minutes, leaving 35 minutes for heating time.

The heat required to warm the purge gas from 100° F. to 300° F. during the heating period is $$28 \times .075 \times .25 \times 200 \times 35 = 3670 \text{ B.t.u.}$$

The total heat requirements, allowing about 10% for heat losses are then 20,650 B.t.u. In order to provide this amount of heat in 35 minutes, a total of $$\frac{20,650}{3,414} \times \frac{60}{35} = 10.4 \text{ kilowatts}$$

of heating capacity must be provided.

By contrast, if the entire bed were to be heated, and the time cycle held, the heat required to heat the entire desiccant bed (192 lbs.) from 100° F. to 300° F. would be 9600 B.t.u. This amount of heat could not be carried off in 21 minutes by 28 s.c.f.m. of purge gas so the purge would have to be increased to about 60 s.c.f.m. and the cooling period increased to 30 minutes. The heating period now becomes 26 minutes and the heat required to heat the purge gas becomes $$60 \times .075 \times .25 \times 200 \times 26 = 5850 \text{ B.t.u.}$$

The total heat requirement, allowing 10% for heat losses, is now about 30,100 B.t.u., an increase of 46%. Further, the heaters must now have a heating capacity of $$\frac{30,100}{3,414} \times \frac{60}{26} = 20.4 \text{ kilowatts}$$

because of the shorter heating time available, an increase of 96%. These larger heaters greatly increase manufacturing cost and the additional power required for regeneration greatly increases operating cost.

It is of course possible to provide a fully heated dryer containing 192 lbs. of desiccant in each tank with smaller heaters, such as 10.4 kilowatts. Under these circumstances, the cycle time must be lengthened to provide longer heating and cooling periods, and the influent flow rating must be reduced proportionately to avoid oversaturating the bed. Thus, the same size dryer operated on a two hour drying cycle could use 10.4 kilowatt heaters, but would have to be rated for only 190 s.c.f.m., a decrease of 50% in capacity.

The dryers in accordance with the invention can be used for drying gases of all types, such as for drying small flows of compressed gases in instrument air, inert gas, and purge systems to dry relatively large volumes of compressed air or gas for industrial and laboratory purposes, and also of relatively large capacity to provide air or gases having sub-zero dewpoints.

The volume of desiccant bed required will be sufficient to provide in the heated portion of the bed the capacity needed for normal operation. There will also have to be provided a sufficient volume of reserve bed without heater units to meet any emergency requirement due to temporary overloading of the equipment, due to the supplying of a gas of an unusually high moisture content, or due to the supplying of the gas at a higher flow rate.

The drying systems in accordance with the invention can include moisture indicators and moisture control systems of various types to measure the effluent flow and to control the cycling between the spent and regenerated beds. Desiccant drain and fill ports can be provided to facilitate servicing of the desiccant, and outlet filters also can be supplied to prevent carryover of desiccant particles from the bed into other parts of the system.

In operation, the dryers of the invention will provide gas of low moisture content at considerably lesser operating cost than a conventional heat reactivated dryer, in which heaters substantially completely fill the bed, due to the mechanical application of heat only to those portions of the bed that actually require it. The reduction in size of the heaters also reduces the time required for cooling of the bed, and the purge gas requirement can also be reduced, as compared to a dryer in which heat is not applied to effect regeneration.

While the invention has been described with principal emphasis on a desiccant dryer and a process for drying gases, it will be apparent to those skilled in the art that this apparatus with a suitable choice of adsorbent can be used for the separation of one or more gaseous components from a gaseous mixture. In such a case, the adsorbed component can also be removed from the sorbent by application of heat, and optionally, in addition, a reduction in pressure during regeneration. Thus, the process can be used for the separation of hydrogen from petroleum hydrocarbon streams and other gas mixtures containing the same, for the separation of oxygen from nitrogen, for the separation of olefins from saturated hydrocarbons, and the like. Those skilled in the art are aware of sorbents which can be used for this purpose.

In many cases, sorbents useful for the removal of moisture from air can also be used, preferentially to adsorb one or more gas components from a mixture thereof, such as activated carbon, glass wool, adsorbent cotton, metal oxides and clays such as attapulgite and bentonite, fuller's earth, bone char and natural and synthetic zeolites. The zeolites are particularly effective for the removal of nitrogen, hydrogen, and olefins, such as ethylene or propylene from a mixture with propane and higher paraffin hydrocarbons, or butene or higher olefins. The selectivity of a zeolite is dependent upon the pore size of the material. The available literature shows the selective adsorptivity of the available zeolites, so that the selection of a material for a particular purpose is rather simple, and forms no part of the instant invention.

In some cases, the adsorbent can be used to separate a plurality of materials in a single pass. Activated alumina, for example, will adsorb both moisture vapor and carbon dioxide, in contrast to Mobilbeads, which will adsorb only water vapor in such a mixture.

The apparatus employed for this purpose will be the same as that described and shown in FIGS. 1 to 4, inclusive, and the process is also as described, suitably modified according to the proportions of the components to be separated, the operating pressure and temperature, and the volume of available sorbent.

It will, however, be understood that the process is of particular application in the drying of gases, and that this is the preferred embodiment of the invention.

The following example in the opinion of the inventors represents a preferred method of operation of a dryer system in accordance with the invention:

EXAMPLE 1

A two bed heat-reactivatable dryer of the type shown in FIGS. 1 to 2, having two disiccant beds 63 inches long, containing in a first layer adjacent the inlet end 20 lbs. of activated alumina, and then in a second layer 152 lbs. of silica gel DE–5, was used to dry atmospheric air of 90% to 100% relative humidity at 100° F. to 70° F. at 90 p.s.i.g. inlet pressure. The superficial flow velocity of the air was 47 cubic feet per minute, and inlet flow as 380 s.c.f.m., and the drying cycle was one hour, allowing two minutes for depressurization, two minutes for repressurization, and two minutes' delay for switching the bends. The heaters were operated during depressurization, and during regeneration the temperature of the outlet purge gas was 160° F. and a relative humidity of 80%. Purge flow was 28 s.c.f.m. Heating time was 36 minutes, and cooling time 21 minutes.

It was apparent from the data for a large number of runs that in each run the heaters had substantially fully regenerated the bed by the time the cycle was terminated at a safe moisture level in the effluent gas. It was also clear from the different times of the cycle that it was possible to adjust cycle length to match variation in moisture level of the influent air, and thus preserve desiccant life by cutting down the number of regenerations materially, without affecting appreciably the completeness of the regeneration.

Having regard to the foregoing disclosure, the following is claimed as the inventive and patentable embodiments thereof:

1. A substantially continuous process for removing a first gas from a mixture thereof with a second gas by flow of the gas mixture continuously through one of two sorbent beds having a preferential affinity for the first gas, which comprises, passing the gas mixture in contact with and from one end to another end of a first bed of the sorbent; sorbing first gas thereon and as the sorption of the first gas continues, forming a concentration gradient of first gas in the first bed progressively decreasing from one end to the other end of the bed ranging from a substantial proportion of the first sorbent capacity therefor at one end to less than 20% of its capacity therefor at the other end, so as to produce a gaseous effluent which has a concentration of the first gas therein below a predetermined maximum; while removing gas sorbed on the second sorbent bed by passing a purge flow of gas in contact with the second bed and heating to an elevated temperature of at least about 100° C. only that portion of the bed sorbed to at least 20% of its capacity with the first gas; discontinuing the heating and allowing the second bed to cool to a relatively efficient temperature for adsorption; and then passing the gas mixture in contact with the second bed while desorbing the first bed in like manner so as to maintain a substantially continuous flow of effluent gas.

2. A process in accordance with claim 1, in which the first gas is water vapor.

3. A process in accordance with claim 1, in which the sorbent is silica gel.

4. A process in accordance with claim 1, wherein the purge flow is of effluent gas from the bed sorbing the first gas.

5. A process in accordance with claim 1, in which the substantial proportion of the sorbent capacity is at least 60%.

6. A process in accordance with claim 1, which comprises removing sorbed gas at a reduced pressure relative to the pressure of adsorption.

7. A substantially continuous process for reducing the concentration of a first gas from a mixture thereof with a second gas to below a limiting maximum concentration thereof in the second gas, by flow of the mixture continuously through one of two sorbent beds having a preferential affinity for the first gas, which comprises, passing the gas mixture in contact with and from one end to another end of a first bed of the sorbent; sorbing first gas thereon to form a gaseous effluent having a concentration of first gas below the maximum, and as the sorption continues, forming a concentration gradient of first gas in the first bed, and an increasing concentration of first gas in the second gas defining a concentration front progressively advancing in the first bed from the one end to the other end as the sorbent capacity therefor decreases; while removing gas sorbed on the second sorbent bed by passing a purge flow of gas in contact with the second bed and heating to an elevated temperature of at least about 100° C. only that portion of the bed through which the concentration gradient has passed during sorption; discontinuing the heating and allowing the bed to cool to a relatively efficient temperature for adsorption; then discontinuing passing the gaseous mixture in contact with the first bed before the concentration front can leave the first bed, and the limiting maximum concentration of first gas in the second gas can be exceeded; and passing the gas mixture in contact with the second bed while desorbing the first bed in a like manner so as to maintain a substantially continuous flow of effluent gas.

8. A process in accordance with claim 7 which comprises applying heat only in that portion of the bed reached by the concentration front during adsorption.

9. A process in accordance with claim 7 which includes removing sorbed first gas from the bed at a pressure below the pressure at which adsorption is effected.

10. A process in accordance with claim 7 which includes removing sorbed first gas from the bed at a pressure below atmospheric.

11. A process in accordance with claim 7 in which the purge flow comprises effluent gas from the bed sorbing the first gas.

12. An apparatus for reducing the concentration of a first gas in a mixture thereof with a second gas to below a limiting maximum concentration thereof comprising, in combination, a pair of beds of sorbent having a preferential affinity for the first gas; an inlet line for delivering influent gas at an inlet end of each bed; and an outlet line for delivering effluent gas from an outlet end of each bed, the influent and the effluent lines being positioned so that all gas flowing between the inlet and outlet lines of each bed must pass through the bed; valve means for directing influent gas flow at all times through the inlet line of one of the two beds; and heater means positioned within a portion of each bed extending from adjacent the inlet end of the bed through at most three-fourths of the length of the bed, said heating means being capable of heating said portion of each bed to a temperature of at least about 100° C. to aid in desorbing first gas sorbed thereon.

13. An apparatus in accordance with claim 12 in which both beds are disposed in separate chambers in a common housing.

14. Apparatus in accordance with claim 12 wherein the heating means are electric heaters.

15. Apparatus in accordance with claim 12, comprising means for diverting a portion of the effluent flow from each bed to the other bed for cyclic desorption of the sorbent beds.

16. Apparatus in accordance with claim 12, including means for reducing pressure during desorption to below the pressure of adsorption.

References Cited

UNITED STATES PATENTS

| 2,801,706 | 8/1957 | Asker | 55—33 |
| 3,141,748 | 7/1964 | Hoke et al. | 55—62 X |
| 3,147,095 | 9/1964 | Kanuck | 55—33 X |
| 2,992,703 | 7/1961 | Vasan et al. | 55—70 |
| 3,085,379 | 4/1963 | Kiyonaga et al. | 55—58 |
| 3,397,511 | 8/1968 | Dwyer et al. | 55—208 |

REUBEN FRIEDMAN, Primary Examiner

C. N. HART, Assistant Examiner

U.S. Cl. X.R.

55—62, 179